Aug. 31, 1954  E. S. CUNNINGHAM  2,687,628
DRINKING CUP
Filed July 11, 1952
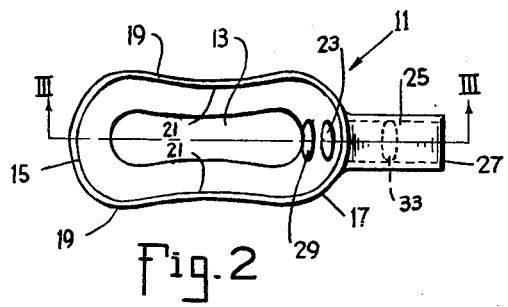
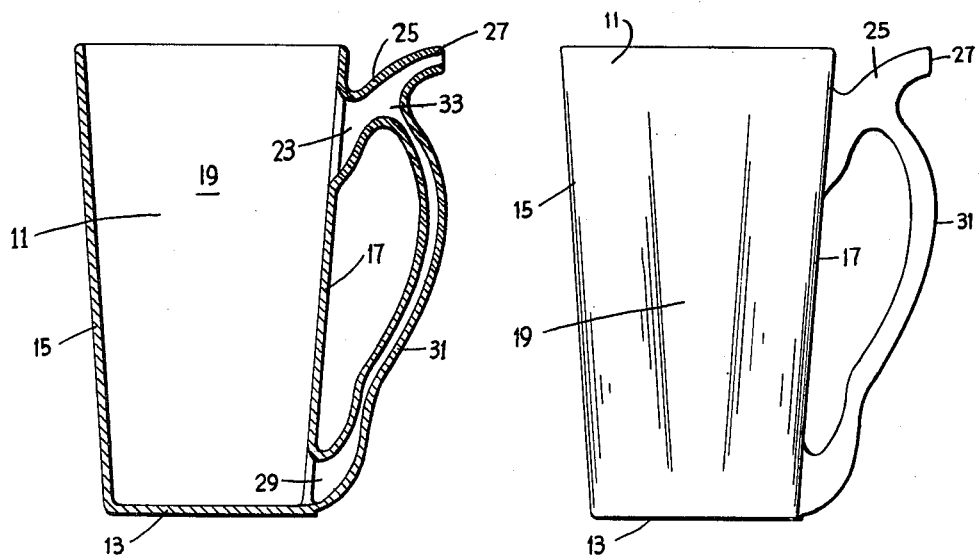
INVENTOR
EMILY S. CUNNINGHAM
BY
Weatherford and Weatherford
attys Patented Aug. 31, 1954

2,687,628

UNITED STATES PATENT OFFICE 2,687,628

DRINKING CUP

Emily Searles Cunningham, Memphis, Tenn.

Application July 11, 1952, Serial No. 298,251

4 Claims. (Cl. 65—13)

This invention relates to certain new and useful improvements in vessels adapted for use as drinking cups, and particularly relates to such vessels which are adaptable for use with invalids and persons of such class, and particularly relates to such a vessel which may be easily handled by an invalid or bed patient with a minimum of danger of spilling and from which the bed patient may conveniently drink even in a reclined position with a substantial elimination of spillage.

The invention particularly relates to such a vessel having a body portion which is formed for ease and convenience of handling and a handle portion for ready grasping, which handle portion is provided with means communicating to the interior of the vessel in order to employ a mouth piece forming part of the handle portion as a means for withdrawing from the contents of the interior of the vessel.

The principal object of the invention is to provide a vessel adapted for use as a drinking cup having a concaved body and a hollow handle portion in which the hollow handle portion extends upwardly from the base of the vessel and communicates with the interior of a hollow, substantially laterally extending spout which terminates in a mouth piece.

A further object of the invention is to provide such a vessel having such a hollow handle and spout with a contour arranged for convenient and efficient grasping by the person making use of the device.

A further object of the invention is to generally improve the design, construction and efficiency of vessels adapted for use as drinking cups to more particularly accommodate such vessels for use of invalids or incapacitated persons.

The means by which the foregoing and other objects of the invention are accomplished and the manner of their accomplishment will readily be understood from the accompanying drawings, in which:

Fig. 1 is a side elevational view of the preferred embodiment of the vessel of the present invention.

Fig. 2 is a top plan view of the vessel; and

Fig. 3 is a sectional elevational view taken as on the line III—III of Fig. 2.

Referring now to the drawings in which the various parts are indicated by numerals, the present device comprises a main body 11, having a bottom 13, a curved front wall 15, a similarly curved rear wall 17, and opposite substantially identical side walls 19. The front, rear and side walls merge together to form a unitary and imperforate body which is secured to bottom 13, preferably integrally, so as to form the body 11 with imperforate front and rear walls and bottom. The body 11 is preferably open at the top for access to the interior of the body. Side walls 19 are respectively concaved, as indicated at 21, thus providing the body of the vessel with convenience of handling in use.

It will be seen from the drawings that not only do the front, rear and side walls and bottom merge together to form a unitary body for the vessel, but the front, rear and side walls also taper toward the bottom 13 so as to taper the body of the vessel.

The rear wall 17 is provided with an upper aperture 23 which is positioned adjacent the top of the rear wall, but spaced below the upper edge of the rear wall and the aperture 23 communicates with a laterally extending hollow spout member 25 which terminates in an outwardly open mouth piece 27. The vessel is further provided with a port 29 which is formed adjacent the bottom 13 of the vessel and which communicates with the hollow interior of a stem handle 31. It will be observed that the stem handle 31 is formed with undulating contours so as to facilitate the use of the stem handle in control of the device and as best shown in Fig. 3, the hollow interior of the stem handle 31 extends from lower port 29 to a junction with the hollow interior of spout 25, as at 33. It will be observed that the point of communication 33 between the stem handle 31 and spout 25 is at a point intermediate the length of the spout and between the upper port 23 and the mouth piece 27. It will be seen that spout 25, as best shown in Fig. 2, is substantially broader than the depth of the spout as shown in Figs. 1 and 3, with the result that the mouth piece 27 is a broad flat mouth piece providing greater convenience in the use of the device.

In the use of the device the interior may be filled through the open top as is conventional. The device may be readily grasped by an invalid or bed patient or other incapacitated person, the concave sides 19 providing a ready grasp for the body of the vessel and the stem handle 31 providing an additional ease and convenience of handling through the particular contours thereof. When it is desired to withdraw the contents from the interior of the vessel it is not necessary for the user to tip the lip of the body of the vessel to his mouth, but he may bring the mouth piece 27 into contact with his mouth, fluid in the upper portion of the vessel flowing through aperture 23, spout 25 and mouth piece 27 into the mouth conveniently and with a minimum of raising of the vessel.

As the level of the fluid in vessel 11 lowers below the level of aperture 23 and interrupts communication of fluid into the interior of spout 25, lower port 29 is effective to receive the outflow of liquid from the interior of the body of the vessel and through the hollow interior of the stem handle 31 to cause this flow to be directed into the spout 25 intermediate its length, whence it may travel to the mouth piece 27 and thence to the user.

It will be seen that this invention provides a highly convenient and efficient vessel adapted particularly for use as a drinking cup or similar object and by virtue of the features of the invention is particularly adapted to minimize the possibility of spillage in use.

I claim:

1. In a vessel adapted for use as a drinking cup, a hollow body portion tapering from top to bottom, the sides of said body portion being concave substantially from top to bottom of said body portion to provide for grasping said body portion, said sides merging into the front and rear of said body portion, said front and rear being convex, a spout laterally projecting from the rear of said body portion adjacent its top, said spout being hollow from end to end and communicating at one end with the interior of said body for fluid flow from said body portion, a laterally outwardly open mouth piece at the other end of said spout, and an undulating stem handle fixed at one end to the rear of said body portion adjacent its bottom, said stem handle being hollow from end to end and communicating at its said one end with the interior of said body portion for fluid flow from said body portion, said stem handle extending upwardly from its said one end and intersecting the under side of said spout intermediate the said spout ends, the opposite end of said stem handle communicating into said spout interior to deliver to said spout fluid received in said stem handle from said body portion.

2. In a vessel adapted for use as a drinking cup, a hollow body portion tapering from top to bottom, the sides of said body portion being concave substantially from top to bottom of said body portion to provide for grasping said body portion, a spout laterally projecting from the rear of said body portion adjacent its top, said spout being hollow from end to end and communicating at one end with the interior of said body for fluid flow from said body portion laterally outwardly, an open mouth piece at the other end of said spout and a stem handle fixed at one end to the rear of said body portion adjacent its bottom, said stem handle being hollow from end to end and communicating at its said one end with the interior of said body portion for fluid flow from said body portion, said stem handle extending upwardly from its said one end and intersecting the under side of said spout intermediate the said spout ends, the opposite end of said stem handle communicating into said spout interior to deliver to said spout fluid received in said stem handle from said body portion.

3. In a vessel adapted for use as a drinking cup, a hollow body portion, a spout laterally projecting from the rear of said body portion adjacent its top, said spout being hollow from end to end and communicating at one end with the interior of said body at a point spaced below the level of the top of said body portion for fluid flow from said body portion, laterally outwardly, an open mouth piece at the other end of said spout, the open end of said mouth piece being substantially at the level of the top of said body, and a stem handle fixed at one end to the rear of said body portion adjacent its bottom, said stem handle being hollow from end to end and communicating at its said one end with the interior of said body portion for fluid flow from said body portion, said stem handle extending upwardly from its said one end and intersecting the under side of said spout intermediate the said spout ends, the opposite end of said stem handle communicating into said spout interior to deliver to said spout fluid received in said stem handle from said body portion.

4. In a vessel adapted for use as a drinking cup, a hollow body portion, a spout laterally projecting from the rear of said body portion adjacent its top, said spout being hollow from end to end and communicating at one end with the interior of said body at a point below the level of the top of said body for fluid flow from said body portion laterally outwardly, an open mouth piece at the other end of said spout, the open end of said mouth piece lying substantially at the level of the top of said body, and a stem handle fixed at one end to the rear of said body portion adjacent its bottom, said stem handle being hollow from end to end and communicating at its said one end with the interior of said body portion for fluid flow from said body portion, said stem handle extending upwardly from its said one end and intersecting said spout intermediate the said spout ends, the opposite end of said stem handle communicating into said spout interior to deliver to said spout fluid received in said stem handle from said body portion.

References Cited in the file of this patent

UNITED STATES PATENTS

| Number | Name | Date |
|---|---|---|
| D. 38,003 | Thuemler | May 8, 1906 |
| D. 38,051 | Noke | June 5, 1906 |
| 1,197,389 | Newton | Sept. 5, 1916 |
| 2,023,470 | Hart | Dec. 10, 1935 |
| 2,355,010 | Pera | Aug. 1, 1944 |

FOREIGN PATENTS

| Number | Country | Date |
|---|---|---|
| 533,631 | France | Dec. 17, 1921 |
| 258,588 | Germany | Apr. 11, 1913 |